2,751,399

HYDROGENATION OF STEROIDS

Gunther S. Fonken, Kalamazoo, Mich., assignor to The Upjohn Company, Kalamazoo, Mich., a corporation of Michigan No Drawing. Application January 8, 1952,
Serial No. 265,547

7 Claims. (Cl. 260—397.45)

The present invention relates to the hydrogenation of steroid compounds and is more particularly concerned with a novel process for the hydrogenation of steroids having a double bond in the four position of the steroid nucleus with hydrogen in the presence of certain novel palladium catalysts.

It is an object of the present invention to provide a process for the hydrogenation, in the presence of a novel palladium-type catalyst, of steroid compounds having a double bond in the four position of the steroid nucleus. Another object of the present invention is the provision of a process for the hydrogenation of steroid compounds having a double bond in the four position, with hydrogen in the presence of a palladium catalyst suspended on a carbonate or an oxide of an element selected from group 2B elements of the periodic table, or a mixture thereof, which process results in the formation of a large proportion of a hydrogenated product having the normal stereochemical configuration of hydrogen at carbon atom five of the steroid nucleus. Other objects of the present invention will be apparent to those skilled in the art to which this invention pertains.

The novel compound of the present invention is 11α-hydroxypregnane-3,20-dione, having the following structural formula:

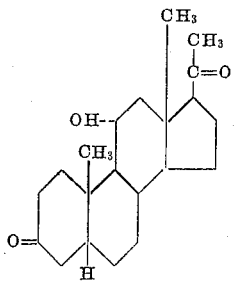

wherein the normal stereochemical configuration of hydrogen is present at carbon atom five of the steroid nucleus. This hydroxy-dione can be converted to certain physiologically active cortical hormones, such as cortisone, by means of reactions known in the art, for example, oxidation of the hydroxyl group at carbon atom 11 to a ketone, introduction of hydroxy groups at carbon atoms 17 and 21, and introduction of a double bond at carbon atom 4.

As previously stated, the process of the present invention results predominantly in the formation of the normal stereochemical configuration of hydrogen at carbon atom five in the steroid nucleus. The normal isomer can be consistently obtained in yields of about seventy per cent, and yields of eighty per cent and better are frequently attained. Production of the normal isomer, and in such high yields, is wholly unexpected in view of the prior art experience which shows that hydrogenation of the double bond in the four position generally results in formation of the allo configuration at carbon atom five or a mixture of the allo and normal configurations with the allo form predominating. [Butenandt, Tscherning and Hanisch, Berichte, 68, 2097 (1935); Butenandt and Fleischer, Berichte, 68, 2094 (1935).] The normal configuration is the more desirable form since this form is much easily converted to the $\Delta^4$-3-keto grouping in the A ring, which is common to most of the physiologically active hormones, than is the allo form.

Starting materials for the process of the present invention are steroid compounds having a double bond in the four position of the steroid nucleus and which compounds may in addition have substituents, such as, for example, ketone, hydroxy, acyloxy, carboxy, carbalkoxy, and the like, attached to one or more of the carbon atoms of the molecule such as, for example, in the 3, 7, 11, 12, 17, 20, 21 and other positions. Such compounds as cholestonone, androstenedione, progesterone, corticosterone, 3,11-diketo-4-etiocholenic acid, testosterone, 17α-hydroxyprogesterone, desoxycorticosterone, desoxycorticosterone acetate, and the like are satisfactory starting steroid compounds. These compounds, as well as numerous others having the requisite unsaturation in the four position of the steroid nucleus, are available through methods known in the prior art. 11α-hydroxyprogesterone may also be used for the process of the present invention. This compound is prepared from progesterone by a fermentation process as more fully described in Preparation 3 following in the specification.

The novel process of the present invention for the saturation of a double bond in the four position of a steriod nucleus includes hydrogenating with hydrogen, in the presence of a hydrogenation catalyst, a steroid compound having a double bond in the four position of the steriod nucleus, the hydrogenation catalyst being palladium supported on a carbonate or an oxide of an element selected from the group consisting of group 2B elements of the periodic table or mixtures thereof.

The catalyst utilized in the novel process of the present invention is preferably formed by adding an excess of a dilute aqueous solution of an alkali metal carbonate, such as sodium carbonate, to a warm, aqueous solution of a chloride or other water-soluble salt of any of the elements in group 2B of the periodic table, namely, zinc, cadmium and mercury, such as, for example, a zinc chloride solution, to form the precipitated carbonate of the group 2B element, as, for example, zinc carbonate. A twenty per cent aqueous solution of sodium carbonate added to an aqueous ten per cent zinc chloride solution at about seventy degrees centigrade is a very satisfactory procedure for forming the precipitated zinc carbonate. The precipitated carbonate of the group 2B element is next slurried in an aqueous solution of a water-soluble palladium salt, such as palladium chloride, aqueous formaldehyde or other lower alkyl aldehyde added, and the resulting mixture warmed at a temperature between about thirty and ninety degrees centigrade, the preferred temperature being sixty degrees centigrade. The warmed mixture is made alkaline with an alkali metal hydroxide, such as aqueous potassium hydroxide, a pH of about nine being preferred, whereupon the palladium separates from the alkaline medium as a black-colored precipitate on the group 2B metal carbonate, such as zinc carbonate. The thus-formed palladium catalyst supported on the metal carbonate is subsequently washed with water by decantation, filtered or separated by any convenient method from the aqueous washings, and dried. Drying may be accomplished at room temperature in vacuo or it may be done at elevated temperatures from about room temperature to about 250 degrees centigrade, about 210 degrees centigrade being preferred. The period of drying is dependent on the temperature used and may vary between about one hour and about 100 hours, with about 75 hours at about 210 degrees centigrade being preferred.

The composition of the catalyst support, as indicated by carbonate analysis, is dependent on the amount of heating involved in the drying operation. Drying between room temperature and a temperature of about 110 degrees centigrade for as long as thirty hours has no appreciable effect on the catalyst support and the catalyst support remains as the carbonate of the group 2B metal. Heating at elevated temperatures as, for example, 210 degrees for forty hours, causes the metal carbonate to lose carbon dioxide and form the metal oxide which then acts as the catalyst support. Heating at intermediate temperatures results in incomplete conversion of the metal carbonate to the metal oxide and the resulting catalyst support is a mixture of the carbonate and the oxide of the group 2B metal. The composition of the catalyst support, in respect to the amount of carbonate or oxide present, is not critical, since both the metal carbonate and the metal oxide and mixtures thereof give equivalent results when used in carrying out the process of the present invention.

A palladium catalyst supported on precipitated cadmium carbonate, cadmium oxide, or a mixture thereof, prepared in essentially the same manner can be advantageously employed, while a palladium catalyst supported on corresponding mercury salts is likewise useful.

The preferred order of hydrogenation is first to subject the palladium on group 2B metal carbonate, oxide, or a mixture thereof, catalyst to hydrogen in conventional hydrogenation apparatus to reduce the catalyst prior to the introduction of the starting steroid material having a double bond in the four position of the steroid nucleus. It is not essential that the catalyst be in a solvent medium, but methanol, hexane, acetone, methyl ethyl ketone, ethanol, or like organic solvent may be advantageously employed. Preferably, an alcohol solvent is used. Alternatively, the catalyst and starting steroid to be hydrogenated can be contacted together in a solvent medium prior to introduction of the hydrogen. It is not necessary to conduct the reaction under pressure, although, when pressure is utilized, a hydrogen pressure of about one to 100 pounds or more is operative. Any suitable temperature between about zero and 100 degrees centigrade may be employed, with room temperature being satisfactory. In the preferred embodiment of the present invention, the starting stearoid material is added to the already reduced catalyst and hydrogenation with hydrogen at atmospheric pressure continued until approximately one molar equivalent of hydrogen has been absorbed. The use of substantially less than one molar equivalent of hydrogen results in the incomplete saturation of the double bond in the four position of the steroid nucleus, whereas the use of substantially more than one molar equivalent of hydrogen does not appear to increase the yield of hydrogenated product and may in some cases even adversely affect the reaction products. The spent catalyst is then separated from the solution containing the hydrogenated products by conventional procedure, such as by filtration, centrifugation or decantation. Filtration is preferred. Conventional separation or extraction procedures can be used in obtaining the hydrogenated products from the solution. Preferably, the hydrogenated products are separated chromatographically by passage through a column packed with a mixture of diatomaceous material, colloidal clays, activated carbons, or other conventional adsorbents, followed by development of the adsorbed reaction products with organic solvents, such as acetone, ethyl acetate, carbon tetrachloride, hexanes, methylene chloride, chloroform, methyl ethyl ketone, or mixtures of such solvents. In some instances, elution of the adsorbed hydrogenated products with selective solvents is desirable, as in the chromatographing of 11α-hydroxypregnane-3,20-dione wherein acetone is preferred and 11α-hydroxyallopregnane-3,20-dione wherein methylene chloride is preferred. The eluted fractions may be evaporated to dryness leaving the crytsalline residue of the desired hydrogenated product which can then be further purified by crystallization from ordinary organic solvents, or alternatively, separation may be achieved by other conventional procedures, such as concentration of the eluates, followed by seeding or fractional crystallization of the compound from solution.

The following examples are illustrative of the process and products of the present invention, but are not to be construed as limiting.

PREPARATION 1.—PALLADIUM CATALYST SUPPORTED ON ZINC CARBONATE-ZINC OXIDE MIXTURE

Eleven grams of anhydrous zinc chloride were dissolved in 100 milliliters of water at seventy degrees centigrade and a twenty per cent aqueous solution of sodium carbonate was added in excess, with constant stirring, forming a precipitate of zinc carbonate. The precipitate was filtered, washed free of alkali with warm water, and re-suspended in 100 milliliters of water forming a slurry. To the aqueous slurry was added five milliliters of a palladium chloride solution containing 0.5 gram of palladium and then one milliliter of thirty-seven per cent aqueous formaldehyde solution. The resulting red-brown colored mixture was warmed on a steam bath to about sixty degrees centigrade and a thirty per cent aqueous solution of sodium hydroxide then added drop-wise, with continual stirring, until the pH of the mixture reached nine, at which point palladium precipitated. The black-colored precipitate was washed by decantation with ten successive fifty-milliliter portions of water and then filtered under suction. The precipitate on the filter funnel was washed six times, dried by suction, and heated in an oven at 210 degrees centigrade for a period of eleven hours. Six and eight-tenths grams of a brown colored catalyst consisting of palladium supported on a zinc carbonate-zinc oxide mixture was obtained.

PREPARATION 2.—PALLADIUM CATALYST SUPPORTED ON CADMIUM CARBONATE

Thirteen and three-tenths grams of cadmium chloride hydrate was dissolved in 100 milliliters of water at seventy degrees centigrade and a twenty per cent aqueous solution of sodium carbonate then added in small portions, with constant stirring, in slight excess until a precipitate of cadmium carbonate was formed. The precipitate was filtered, washed free of residual alkali with warm water, and re-suspended in 100 milliliters of water to form a slurry. To this slurry was added six milliliters of an aqueous solution of palladium chloride containing 0.6 gram of palladium, and then one milliliter of a thirty-seven per cent aqueous solution of formaldehyde. The mixture was warmed on a steam bath to 65 degrees centigrade and a thirty per cent aqueous solution of sodium hydroxide was added drop-wise, with continual stirring, until the palladium precipitated at a pH of about nine. The black-colored precipitate was washed by decantation with twelve successive fifty-milliliter portions of water and then filtered by suction. The precipitate on the funnel was washed eight times, dried by suction, and heated in an oven at 110 degrees centigrade for a period of 40 hours. Seven and two-tenths grams of a catalyst consisting of palladium supported on cadmium carbonate was obtained.

PREPARATION 3.—11α-HYDROXYPROGESTERONE

To four liters of a 32–48 hour growth of culture RH 176 (*Rhizopus arrhizus* strain) was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride.

The methylene chloride extracts were combined and washed with two 400 milliliter portions of two per cent aqueous sodium bicarbonate solution and three 500 milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature whereupon 75 milligrams of crystals separated out. The mother liquor was freed of solvent by aeration, dissolved in fifty milliliters of benzene, and chromatographed over alumina ($Al_2O_3$). Fifty grams of acid-washed alumina, dried at 45 degrees centigrade, was used as adsorbent and 100 milliliter portions of solvents were used to develop the column. The solvents and the order used were as follows: benzene, benzene, benzene plus 5% ether, benzene plus 5% ether, benzene plus 10% ether, benzene plus 10% ether, benzene plus 10% ether, benzene plus 50% ether, benzene plus 50% ether, ether, ether, ether plus 5% chloroform, ether plus 5% choloroform, ether plus 10% chloroform, ether plus 10% chloroform, ether plus 50% chloroform, ether plus 50% chloroform, chloroform, chloroform, chlorform plus 5% acetone, chloroform plus 5% acetone, chloroform plus 10% acetone, chloroform plus 10% acetone, chloroform plus 50% acetone, chloroform plus 50% acetone, acetone, acetone, acetone plus 5% methanol, acetone plus 5% methanol, acetone plus 10% methanol, acetone plus 10% methanol, acetone plus 50% methanol, acetone plus 50% methanol. The chloroform and chloroform plus 5% acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade was obtained. A recrystallized sample gave the following constants: melting point, 166–167 degrees centigrade; $[\alpha]_D^{20}$ plus 175.9 degrees (chloroform).

Analysis.—Per cent calculated for $C_{21}H_{30}O_3$: C, 76.4; H, 9.10. Found: C, 76.6; H, 8.92.

The structure of this product was further established by its conversion, with chromic acid in acetic acid, to the known 11-ketoprogesterone [Reichstein, Helv. Chim. Acta., 23, 684 (1940); ibid. 26, 721e (1943)].

*Example 1.—Hydrogenation of 11α-hydroxyprogesterone*

Two hundred and fifty milligrams of palladium on zinc carbonate-zinc oxide mixture catalyst in 100 milliliters of methanol was hydrogenated to reduce the catalyst, five hundred milligrams of 11α-hydroxyprogesterone added, and the hydrogenation then continued until one mole equivalent of hydrogen had been absorbed. The mixture was filtered and the filter cake, containing primarily the precipitated catalyst, was washed with four successive 25-milliliter portions of acetone. The acetone washings were combined with the methanolic filtrate and the resulting solution chromatographed on a column containing 25 grams of a mixture formed in the ratio of one part by weight of activated carbon (Darco G–60) to two parts by weight of diatomaceous earth (Celite 545). The column was developed with eight successive 200-milliliter portions of acetone. The first five acetone fractions were then combined and evaporated to dryness, yielding 334.7 milligrams of crystalline 11α-hydroxypregnane-3,20-dione. The chromatographic column was then further developed with four successive 200-milliliter portions of methylene chloride, which portions were then combined and evaporated to dryness, yielding 128.1 milligrams of crystalline 11α-hydroxyallopregnane-3,20-dione. The yield of 11α-hydroxypregnane-3,20-dione was 68 per cent of the theoretical while the total recovery from the chromatographic column was 96.1 per cent of the theoretical.

*Example 2.—Hydrogenation of 11α-hydroxyprogesterone*

A slurry of two grams of palladium on zinc oxide catalyst and four grams of 11α-hydroxyprogesterone in fifteen milliliters of methanol was hydrogenated at a temperature of 29 degrees centigrade and at a hydrogen pressure of fifteen pounds per square inch. After one mole equivalent of hydrogen had been absorbed, the reaction mixture was worked up as in Example 1. The yield of 11α-hydroxypregnane-3.20-dione was 86.8 per cent and the yield of 11α-hydroxyallopregnane-3,20-dione was 13.2 per cent. The recovery from the column was quantitative.

*Example 3.—Hydrogenation of 11α-hydroxyprogesterone*

Two hundred and fifty milligrams of palladium on cadmium carbonate catalyst in 100 milliliters of methanol was hydrogenated to reduce the catalyst, 500 milligrams of 11α-hydroxyprogesterone added, and hydrogenation then continued until a total of one mole equivalent of hydrogen had been absorbed. The reaction mixture was filtered, the filter cake washed with 100 milliliters of acetone in small portions, and the washings combined with the methanolic filtrate. The resulting solution was chromatographed on 25 grams of a mixture formed in a ratio of one part by weight of activated carbon (Darco G–60) to two parts by weight of diatomaceous earth (Celite 545). The column was developed with eight successive 200-milliliter portions of acetone and the first five acetone fractions evaporated to dryness, yielding 356.1 milligrams of 11α-hydroxypregnane-3,20-dione. Further development of the chromatographic column with methylene chloride resulted in 128.6 milligrams of 11α-hydroxy-allopregnane-3,20-dione being obtained.

*Example 4.—Hydrogenation of desoxycorticosterone acetate*

One gram of desoxycorticosterone acetate was dissolved in 100 milliliters of methanol and 500 milligrams of palladium on zinc oxide catalysts was added. The mixture was hydrogenated until one mole equivalent of hydrogen was absorbed, filtered and the filter cake washed with acetone. The acetone washings were combined with the methanolic filtrate and the resulting solution chromatographed on a column containing fifty grams of a mixture formed in the ratio of one part by weight of activated carbon (Darco (G–60) to two parts by weight of diatomaceous earth (Celite 545). The column was developed with acetone followed by methylene chloride. The acetone eluate on evaporation yielded 742 milligrams (73 per cent) of crude 21-acetoxypregnane-3,20-dione. The methylene chloride eluate yielded 277 milligrams (27 per cent) of 21-acetoxyallopregnane-3,20-dione. On recrystallization the normal compound melted at 149 to 154 degrees centigrade and the allo compound melted at 171.5 to 177 degrees centigrade.

*Example 5.—Hydrogenation of cholestenone*

Following the procedure given in Examples 1 through 4, cholestenone is hydrogenated over palladium on cadmium carbonate-cadmium oxide catalyst to yield mainly coprostanone.

*Example 6.—Hydrogenation of progesterone*

Following the procedure given in Examples 1 through 4, progesterone is hydrogenated over palladium on zinc carbonate catalyst to yield mainly pregnane-3,20-dione.

In the same manner as illustrated in the above Examples, other steroid compounds having a double bond in the four position of the steroid nucleus, such as 4-androstene - 3,17 - dione, adrenosterone, corticosterone, 3,11-diketo-4-etiocholenic acid, testosterone, 17α-hydroxyprogesterone, 3-keto-11β, 17α-dihydroxy-4-etiocholenic acid, 17α-hydroxycorticosterone, 17-hydroxydesoxycorticosterone and dehydrocorticosterone are hydrogenated in the presence of the palladium catalyst prepared according to the method of Preparations 1 and 2 to produce the corresponding steroid derivative of the normal configuration.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the saturation of a double bond in the four position of a 3,20-diketo-$\Delta^4$-pregnene which comprises the step of hydrogenating, with hydrogen and a hydrogenation catalyst, a 3,20-diketo-$\Delta^4$-pregnene, the hydrogenation catalyst being palladium plus a member of the group consisting of the carbonate, the oxide, and mixtures of the carbonate and oxide, of a group 2B element of the periodic table, to obtain a hydrogenated product containing a high ratio of normal 3,20-diketopregnane to 3,20-diketo-allopregnane, and separating the normal 3,20-diketopregnane.

2. A process for the saturation of a double bond in the four position of a 3-keto-$\Delta^4$-pregnene which comprises: hydrogenating with hydrogen and a hydrogenation catalyst a 3-keto-pregnene having a double bond in the four position of the pregnene nucleus, characterized by the hydrogenation catalyst being palladium supported on a catalyst support selected from the group consisting of the carbonate, the oxide, and mixtures of the carbonate and oxide of a group 2B element of the periodic table, to obtain a hydrogenated product containing a high ratio of normal 3-ketopregnane to 3-ketoallopregnane, and separating the normal 3-ketopregnane.

3. The process for the saturation of a double bond in the four position of a pregnene nucleus which comprises: hydrogenating with hydrogen and a hydrogenation catalyst a pregnene having a double bond in the four position of the nucleus, the hydrogenation catalyst being palladium supported on a catalyst support selected from the group consisting of the carbonate, the oxide, and mixture of the carbonate and oxide of a group 2B element of the periodic table, to obtain a hydrogenated product containing a high ratio of normal pregnane to allopregnane, and separating the thus-produced normal pregnane.

4. The process for the saturation of a double bond in the four position of 11$\alpha$-hydroxyprogesterone which comprises: hydrogenating 11$\alpha$-hydroxyprogesterone with hydrogen and a hydrogenation catalyst, the hydrogenation catalyst being palladium supported on zinc carbonate, and separating 11$\alpha$-hydroxypregnane-3,20-dione.

5. The process for the saturation of the double bond in the four position of 11$\alpha$-hydroxyprogesterone which comprises: hydrogenating 11$\alpha$-hydroxyprogesterone with hydrogen and a hydrogenation catalyst, the hydrogenation catalyst being palladium supported on a catalyst support, selected from the group consisting of the carbonate, the oxide, and mixtures of the carbonate and oxide of a group 2B element of the periodic table, and separating 11$\alpha$-hydroxypregnane-3,20-dione.

6. The process for the saturation of the double bond in the four position of 11$\alpha$-hydroxyprogesterone which comprises: hydrogenating 11$\alpha$-hydroxyprogesterone with hydrogen and a hydrogenation catalyst, the hydrogenation catalyst being palladium supported on zinc oxide, and separating 11$\alpha$-hydroxypregnane-3,20-dione.

7. The process for the saturation of the double bond in the four position of 11$\alpha$-hydroxyprogesterone which comprises: hydrogenating 11$\alpha$-hydroxyprogesterone with hydrogen and a hydrogenation catalyst, the hydrogenation catalyst being palladium supported on a mixture of zinc carbonate and zinc oxide, and separating 11$\alpha$-hydroxypregnane-3,20-dione.

References Cited in the file of this patent

Pearlman: Jour. Biol. Chem. 166, pp. 473–76 (1946).
Grasshof, Zeit. Physiol. Chem. 223, 249–251 (1934).